March 22, 1966 L. J. LEVINE 3,241,245
DEVICE FOR SENSING ANGLES OF INCLINATION
Filed May 4, 1962
6 Sheets-Sheet 1

INVENTOR.
LAWRENCE J. LEVINE
BY
ATTORNEYS

INVENTOR.
LAWRENCE J. LEVINE
BY
ATTORNEY

March 22, 1966  L. J. LEVINE  3,241,245
DEVICE FOR SENSING ANGLES OF INCLINATION
Filed May 4, 1962

INVENTOR.
LAWRENCE J. LEVINE
BY
ATTORNEY

March 22, 1966    L. J. LEVINE    3,241,245
DEVICE FOR SENSING ANGLES OF INCLINATION
Filed May 4, 1962    6 Sheets-Sheet 6

INVENTOR.
LAWRENCE J. LEVINE
BY
ATTORNEYS

United States Patent Office 3,241,245
Patented Mar. 22, 1966

3,241,245
DEVICE FOR SENSING ANGLES OF
INCLINATION
Lawrence J. Levine, Nassau County, N.Y., assignor to
Belock Instrument Corporation, College Point, N.Y., a
corporation of New York
Filed May 4, 1962, Ser. No. 199,551
14 Claims. (Cl. 33—215)

This application is a continuation-in-part of my copending application for Device for Sensing Angles of Inclination, Serial No. 110,367, filed May 16, 1961, now abandoned. The present invention relates to a device for sensing angles of inclination.

It is an object of my invention to provide an angle sensing device of the character described which is particularly useful for marine applications.

It is desirable for various reasons to ascertain small angles of inclination in connection with certain marine applications. For instance, when a vessel is to be set in a floating drydock better stability and greater efficiency will be secured if the drydock is inclined at an angle which closely matches the angle of inclination of the vessel, the latter often deviating somewhat from the vertical. Also such small angles may be measured aboard a ship for determining the metacentric height. In the latter case weights are moved transversely of the ship and the angles of inclination determined for different arrangements of weights, the metacentric height being a function of the change in inclination.

For both the foregoing marine uses it has been customary to employ one or more pendulums supported on very long arms and movable in a viscous fluid such as an oil, the inclination of the floating body being read by the angular location of the pendulum or its arm with respect to the body. Not only in this arrangement awkward, cumbersome and wasteful of personnel but it is slow and tedious to carry out and the results are not particularly accurate.

It is an object of my invention to provide an angle sensing device of the character described which is of extremely compact and relatively light construction, which is quick and certain in operation and accurate in measurement, which can be set up rapidly and easily, and which is readily portable so that it can be advantageously employed to sense angles of inclination under stationary marine conditions, i.e. stationary in the sense that the ship or the like is not under way.

It is another object of my invention to provide an angle sensing device of the character described which is not only particularly adapted for the foregoing special uses but is, in addition, capable of general utility as, for example, for continuous checking of the metacentric height of a vessel during loading, or for checking already installed reference planes and lines in ships or on shore, or for installing at predetermined angles including parallelism reference planes and lines for marine or general use, notably, for example, during ship building when the keel is at an angle to the horizontal, or for topographical mapping, e.g., for checking the inclinations, banks and grades of roads and highways.

It is another object of my invention to provide an angle sensing device of the character described which can, by slowing its speed of response, be used to determine angles of a ship under way at sea as, for instance, to ascertain whether there is a shift of cargo and to take corrective action by rearranging the ballast.

It is, accordingly, another object of my invention to provide a simple, rugged, easy-to-handle and fast and easy-to-read angle sensing device of general application.

It is another object of my invention to provide an angle sensing device of the character described which can be used alone or in conjunction with remote reading stations so that angles in different bodies may be compared at a single master station or so that a single angle may be sensed at one point and read at another.

It is another object of my invention to provide an angle sensing device of the character described which is highly sensitive and yet which quickly dampens so that it can be read within a very short time, e.g. seconds, after a change of angle is experienced.

It is another object of my invention to provide an angle sensing device of the character described which can be set up very speedily, e.g. in a few minutes, as compared with the hours formerly needed to set up a long pendulum sensing device.

It is another object of my invention to provide an angle sensing device of the character described which is easy to adjust as to sensitivity and zero setting, which has vernier and coarse indications of the angle of inclination so that the angle can be read quickly and simply and with high accuracy, and which furnishes a linear (uniformly graduated) scale of readings.

Other objects of my invention in part will be obvious and in part will be pointed out hereinafter.

My invention accordingly consists in the features of construction, combinations of elements, and arrangements of parts which will be exemplified in the devices hereinafter described, and of which the scope of application will be indicated in the appended claims.

In the accompanying drawings, in which are shown various possible embodiments of my invention.

In general, I accomplish the several objects of my invention by mounting a pendulum for rotation about a horizontal axis on a frame that is supported by at least three legs on a surface of which the inclination is to be measured. The pendulum is free swinging except for a constraining cage. The cage is arranged to turn about a horizontal axis which to simplify the provision of linear readings is coincident with the axis of rotation of the pendulum. Said cage includes fixed, i.e. rigid or unyielding, stops that permit a small amount of movement of the pendulum with respect to the cage. The dead space provided for movement of the pendulum relative to the stops is quite tiny, being measurable in minutes, the entire dead space, i.e. the total on both sides of a central position, being in the order of thirty minutes.

A reversible follower motor is included to swing the cage about its axis of rotation, said motor driving the cage through a train or reduction gears. For any angular motion of the instrument about the pendulum axis the angle of displacement of the pendulum within the dead space and with respect to the cage is the same as the angular motion input in that the pendulum tends to remain fixed in space. The angular speed of the cage when driven is a fixed value dependent upon the motor speed and gear train reduction. Thus, should the angle of displacement of the pendulum exceed the dead space, the pendulum can never move faster than the cage when the rate of change of the angle of displacement imposed upon the instrument exceeds the maximum angular speed of the cage.

Furthermore, sensing means is included as part of a servo follow-up system to actuate the motor so as to cause the cage to follow the pendulum when the position of the pendulum is disturbed. Said sensing means conveniently constitutes cooperating pairs of contacts carried by the cage and pendulum and so arranged that when the pendulum moves angularly with respect to the cage, one or the other pair of contacts will close to complete a circuit which energizes the motor to drive the cage in the same direction as the pendulum. The dead space between the cage contacts and the pendulum contact is small with respect to the dead space between the pendulum and caging stops whereby said contacts engage before and disengage after the corresponding engagement and disengagement between the pendulum and the caging stops.

Since the angular speed of the cage is less than the normally expected rate of change of the angle of displacement of the pendulum imposed on the instrument, the cage restrains relative movement of the pendulum consequent upon such movement of the instrument so that the pendulum moves slowly to a new equilibrium position. As the new equilibrium position is reached the sensing means opens to idle the motor which preferably is connected in a braking circuit, e.g., for dynamic braking, so that the cage stops quickly. The pendulum then floats freely in the cage in the contact dead space.

The stability of the servo follow-up system is achieved by the dynamic response of the cage drive with respect to the pendulum through the medium of design parameters (primarily, motor speed and gear train reduction, the motor accelerations and reversal being rapid, the relay operating times being small and torsional displacements being negligible so that these latter are second order effects) that establish the frequency response of the cage servo follow-up system, at a value considerably (e.g. not in excess of a ratio of 0.5) less than the actual oscillatory frequency of the pendulum swinging between the contacts of the cage (the contact dead space). "Frequency response" is a term well known in the art of servomechanisms and defines the limit of an oscillatory input that a servo system can follow. In the example hereinafter set forth the undamped oscillatory frequency of the pendulum is about 1.3 cycles per second. As noted above contacts are located in the path of movement of the pendulum. These are spring mounted to induce a spring action which modifies the oscillatory frequency of the pendulum. In the aforesaid example such spring action of the contacts results in an actual oscillatory frequency for the pendulum of about 2 cycles per second. Thus the frequency response of the servo follow-up system over an amplitude in excess of the contact dead space (which in the following example has a single amplitude of one minute of arc), e.g. for a single amplitude of two minutes, is not in excess of one half of 2 cycles per second, i.e. not in excess of one cycle per second, preferably being as low as 0.5 cycle per second.

Desirably the sensing means is such or some other means is provided to absorb energy and thereby damp movement of the pendulum within the limits permitted by the sensing means so that the pendulum is quickly brought almost to fully stationary condition. However, such damping means still provides a dead space so as to permit minute excursions of the pendulum without energizing the sensing means whereby the pendulum never is fully quiescent and thus is not subjected to static friction in its bearings. In this manner the sensitivity of the device is maintained at a high level.

The follower motor is connected to a read-out device which preferably includes both coarse and fine readings so that the position of the cage and therefore of the pendulum is readily ascertainable.

If desired, the read-out means may be viewed both at a master unit and a synchro driven slave unit.

The accuracy of the device desirably may be increased by employing low loss friction suspensions for the pendulum and by installing the sensing means at as remote a point as conveniently is practicable from the axis of rotation of the pendulum so as to amplify relative movement of the pendulum and the cage.

Referring now in detail to the drawings, and more particularly to FIGS. 1–8 and 11–14, the reference numeral 20 denotes an angle sensing device constructed in accordance with my present invention and constituting a master unit 22 and a slave unit 24. Inasmuch as the master unit includes all the principal and necessary parts of the invention and components thereof, it first will be described.

Figure 3:
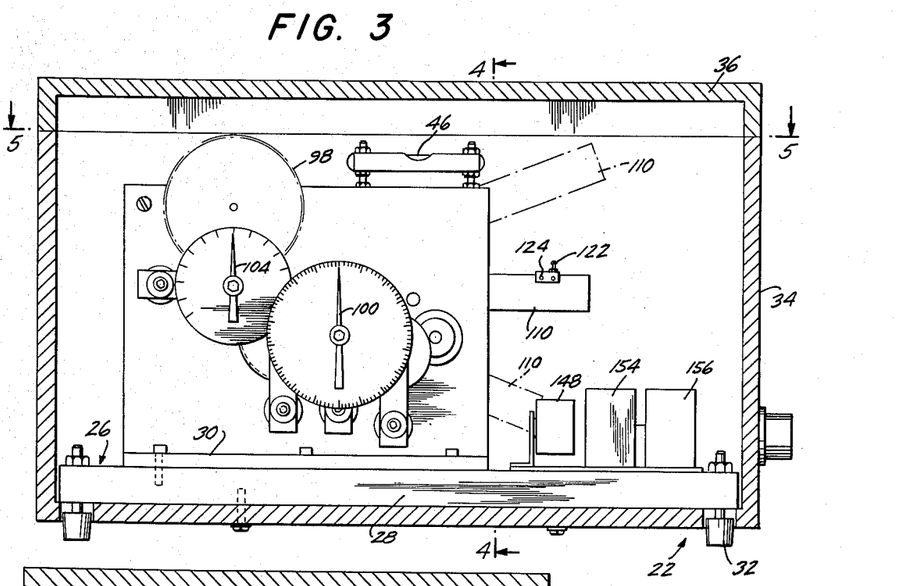
FIG. 3 is a front view of the master sensing unit with the front wall of its housing removed.
Figure 4:
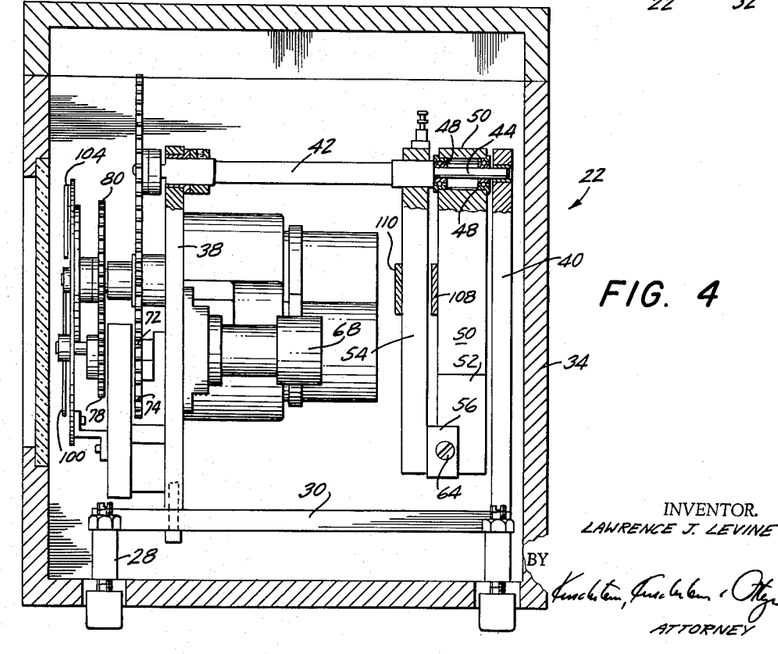
FIGS. 4 and 5 are sectional views taken substantially along the lines 4—4 and 5—5, respectively, of FIG. 3.
Figure 5:
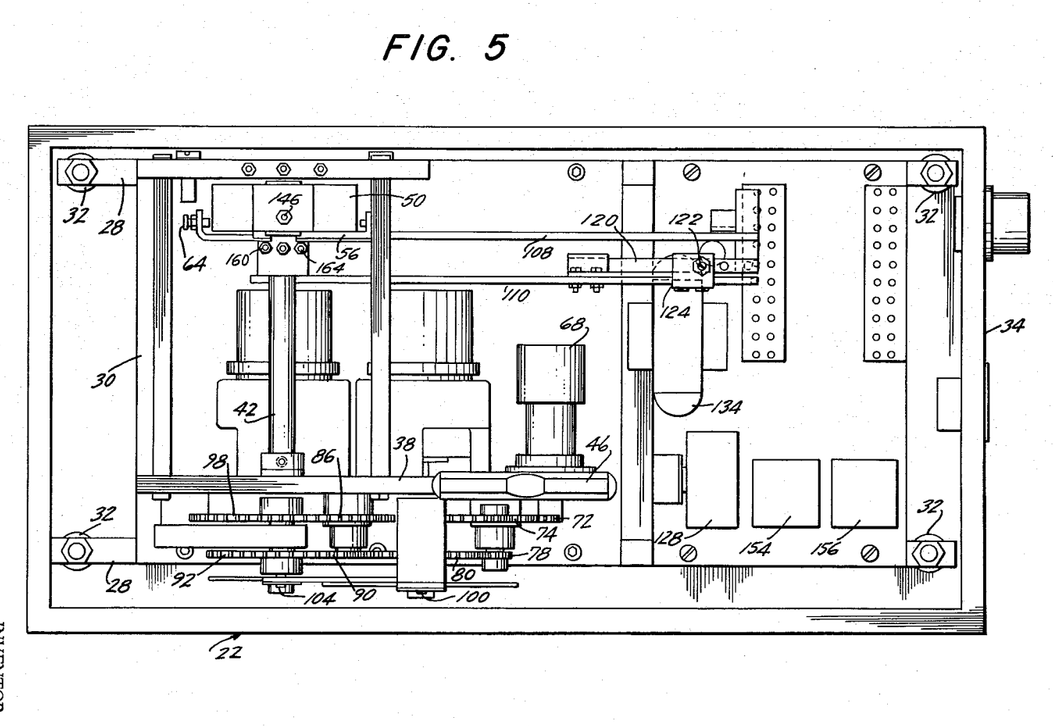

Said master unit includes a frame 26 comprised of two long rigid parallel bars 28 joined by a transverse base plate 30. At each end of each bar a dependent leg 32 is provided, said legs being vertically adjustably connected to the bars so that they can be shifted to conform to a flat plane and locked in such position.

The master unit is encased in a housing 34 having a top cover 36, the housing and cover being carried by the bars 28 so that, in effect, said housing and cover simply form a shell which conceals and protects the working parts of the master unit. Said housing is not intended to rest directly on a surface of which the inclination is to be measured.

A vertical front plate 38 and a rear plate 40 are supported in parallel relationship on the base plate 30. Said plates are provided with horizontally aligned bearings in which there are journalled the opposite ends of a drive shaft 42 the rear end of which includes a portion 44 of reduced cross-section. Said drive shaft is parallel to the base plate 30 and is intended to be substantially horizontal when the angle sensing device is in use. To assist in leveling the frame 26, I provide a bubble level 46 on the front plate 38.

The inner races of a pair of spaced ball bearings 48 are fixed to the reduced cross-section portion 44 of the drive shaft 42. The outer races of said ball bearings are secured to the upper end of a pendulum arm 50 to the lower end of which there is attached a pendulum weight 52.

Rigidly attached to the drive arm 42 alongside and approximately parallel to the pendulum arm 50 is a cage arm 54 having fastened on its lower end a cage 56.

The cage constitutes a heavy sheet metal plate of U-shaped horizontal cross-section (see FIG. 6) including a base 58 and a pair of opposed arms 60, 62. Each arm mounts a horizontal caging screw 64, i.e. stop, threaded into a tapped opening in the arm and held in place by a lock nut 66. The tips of the caging screws are located on opposite sides of the pendulum weight 52, the distance between said tips being slightly in excess of the width of the pendulum weight so that when the pendulum is stationary and is centrally located between the tips of the two caging stops a dead space will be provided between the pendulum and stops. Desirably, the screws are set so that this caging dead space is very small, e.g. in the order of one-quarter degree to each side of center, i.e. a total caging dead space of one-half degree. It should be pointed out here that this caging dead space is not to be confused with contact dead space heretofore and hereinafter mentioned and which contact dead space determines the operation of the servo follow-up system. The caging stops principally function to prevent too large an accumulation of kinetic energy in the pendulum and to permit the use of light contacts in the servo follow-up system.

It will be appreciated that since the ball bearings 48 are coaxial with the journals for the drive shaft, both the cage and the weight turn about a common axis of rotation, the pendulum being free to move except for the constraint of the cage and the cage being rotated by the drive shaft.

The drive shaft is turned by a reversible D.C. drive motor 68 having an output shaft 70. A pinion 72 mounted on the output shaft 70 drives a gear 74 on a first counter shaft 76. A pinion 78 on the first counter shaft 76 drives a gear 80 on a second counter shaft 82. Thus the pinions and gears 72, 74, 78, 80 form the first section of a reduction gear train which turns the second counter shaft. This section has a reduction ratio of about eight to one.

A pinion 84 on the second counter shaft meshes with a gear 86 on a third counter shaft 88. A pinion 90 on the third counter shaft 88 meshes with a gear 92 on a fourth counter shaft 94. A pinion 96 on the fourth counter shaft meshes with a gear 98 on the drive shaft 42.

The second section of the gear reduction train includes the pinion and gear 84, 86 and the pinion and gear 90, 92. Said pinions and gears are so proportioned that the step down ratio from the second counter shaft 82 to the fourth counter shaft 94 is twenty to one.

The third section of the gear reduction train includes the pinion 96 and gear 98. The ratio between the fourth counter shaft 94 and the drive shaft 42 is six to one. The ratio between the second counter shaft 82 and the drive shaft 42 is, accordingly, one hundred twenty to one.

The second counter shaft 82 turns a first pointer 100 which is read against uniform, i.e. linear, graduations on a dial 102. The fourth counter shaft 94 turns a second pointer 104 which is read against uniform graduations on a dial 106. The pointer 100 is the fine pointer and the pointer 104 is the coarse pointer, it being obvious that the pointer 100 experiences only one-twentieth of the angular displacement of that of the pointer 104 for equal angular displacements of the drive shaft 42. The one hundred twenty times amplification of the pointer 100 enables it to turn one hundred twenty degrees for each degree of movement of the drive shaft. This is the equivalent of a two degree movement of the pointer for each minute of movement of the drive shaft.

All of the parts of the servo follow-up system which have been described are sufficiently stiff to make torsional displacement effects negligible.

As indicated earlier I provide spaced sensing means which are responsive to displacement of the pendulum relative to the cage in order to energize the reversible motor 68 so as to drive the cage through the reduction gear train in the direction of displacement of said pendulum so long as one or the other sensing means is energized. Any type of sensing means can be used as, for example, photo-electric, capacitative, inductive, magnetic or electro-mechanical. In the preferred form of my invention I employ electro-mechanical sensing means since they are able to provide an additional function, to wit, damping which will be described.

Furthermore, in order to increase the sensitivity of the sensing means I displace the same as far as practicable from the drive shaft while still maintaining them within the confines of the housing 34. For ready portability the pendulum and caging arms 50, 54 are made comparatively short, for example, in the order of six inches. Although the sensing means could be mounted directly upon the cage and the pendulum weight the motion experienced thereby would be limited to the extent of movement of the pendulum weight and cage. This movement can be somewhat enlarged by mounting the sensing means on members carried by the pendulum and cage but displaced laterally therefrom. For this purpose I employ a first horizontal strut 108 secured to the pendulum arm 50 and extending horizontally away therefrom at right angles thereto and a second horizontal strut 110 secured to the caging arm 54 and extending horizontally away therefrom at right angles thereto and in proximity to the pendulum strut 108. Since the housing is comparatively long the distal ends of the two struts 108, 110 easily can be spaced further from the drive shaft 42 than the pendulum weight and the cage.

Figures 6, 7, 8:
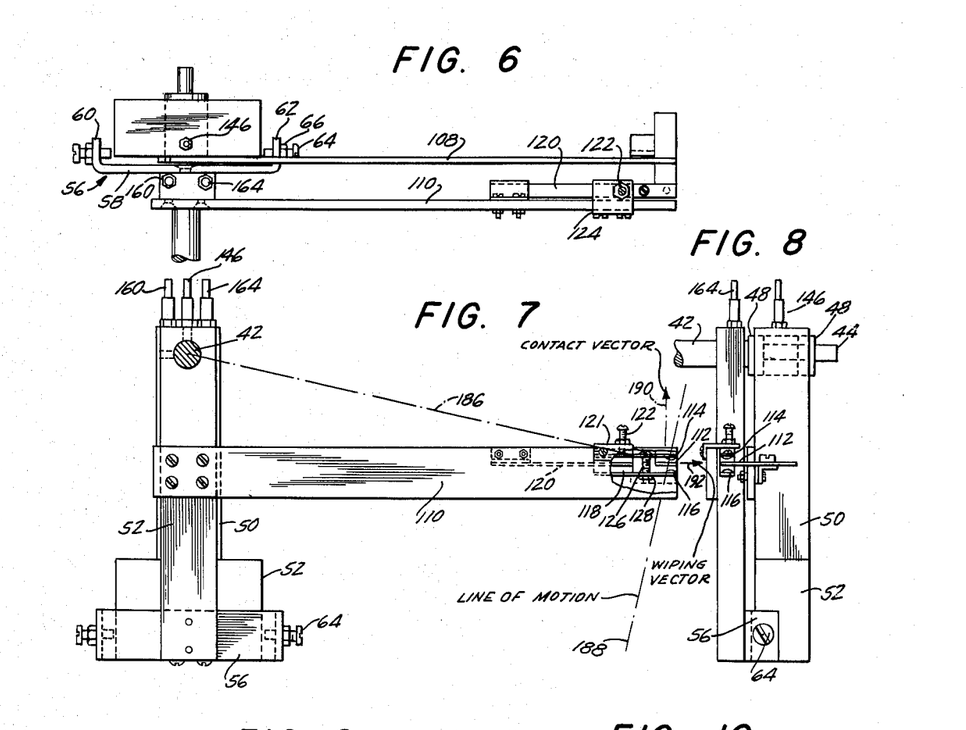
FIG. 6 is a top view of the pendulum, the cage and the sensing contacts which form a part of my master angle sensing unit.
FIG. 7 is a front view of said pendulum, cage and contacts.
FIG. 8 is a side view of the pendulum, cage and contacts.

The electro mechanical-sensing means at the distal tips of the struts includes a central contact 112 at the tip of the strut 108 and a pair of spaced contacts 114, 116 carried at the end of the strut 110. The contact 112 is located between the contacts 114, 116, the total contact dead space between the contact 112 on the one hand and the contacts 114, 116 on the other being less than the total caging dead space between the caging screws and the pendulum weight whereby before the pendulum abuts either caging screw, the central contact 112 first will engage one or the other of the contacts 114, 116 (the central contact and each different contact 114, 116 constitutes a different pair of follower contacts). The total contact dead space is small compared to the total caging dead space, e.g. two minutes as compared to thirty minutes. The caging screws prevent any substantial strain from being imposed upon the contacts 112, 114, 116.

The contacts 114, 116 are parallel elongated resilient electrically conductive metal strips the planes of which are disposed in positions other than parallel to the radial line from the drive shaft 42 to the contact 112. Hence as the contact 112 engages or disengages either of the contacts 114 or 116 it will do so at an angle other than 90°.

Both contacts 114, 116 are cantilever supported and held apart by a stack of insulated spacers 118 which is carried at the free end of a leaf spring 120 cantilever supported on the strut 110. Thereby movement of the stack of spacers, and thus of the contacts 114, 116 jointly, is permitted with respect to said strut in a direction perpendicular to the length thereof. This movement enables a zero adjustment to be performed in a manner which will soon be described. For this purpose I employ a zero adjustment screw 122 which is threaded in a bracket 124 secured to the strut and bears against the stack of spacers 118 in a direction perpendicular to the lengths of the contacts 114, 116. The leaf spring 120 biases the stack against the tip of the screw 122.

A sensitivity adjusting screw 126 is included for setting the contact dead space between the contacts 114, 116 and the contact 112. The adjustment screw 126 mates with a nut 128. The shank of said screw passes through both of the contact strips 114, 116 with the head of the screw and the nut 128 on the outer sides of the respective contact strips. Either an insulated screw is employed or, if a conductive screw is used, it is insulated from the contact strips 114, 116 by electrically nonconductive bushings.

Figure 11:
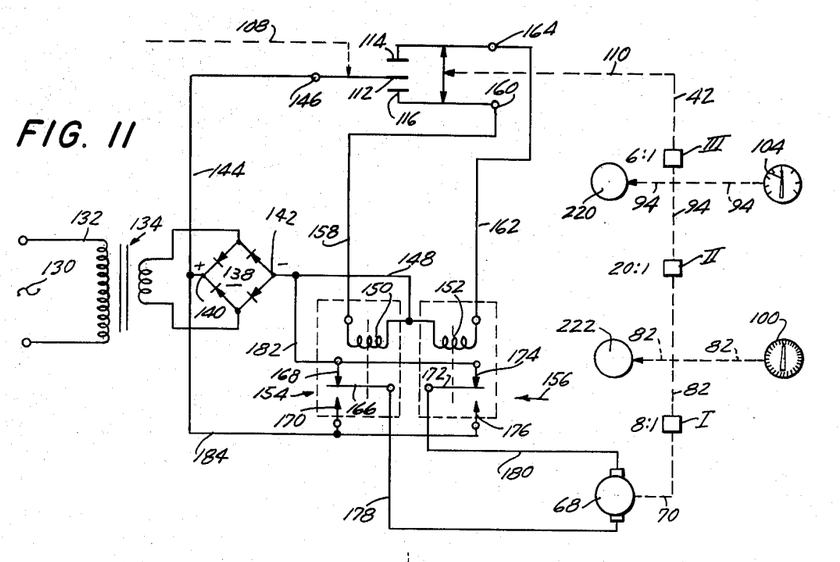
FIG. 11 shows the electric circuit of the master unit of my angle sensing device.

A suitable electric circuit is provided to energize the reversible D.C. follower motor 68 in a proper direction when one or the other of the pair of contacts 112, 114, or 112, 116 is engaged. Such a circuit is shown in FIG. 11 wherein the reference numerals 112, 114 and 116 denote the aforesaid contacts, and the reference numeral 68 denotes the reversible D.C. motor.

The circuit is energized from a source 130 of alternating current which is connected to the primary 132 of a step-down transformer 134 the secondary 126 of which feeds two opposite junctions of a full wave rectifier bridge 138 having a positive output junction 140 and a negative output junction 142.

The positive output junction 140 is connected by a lead line 144 and a terminal 146 to the central contact 112 carried by the pendulum strut 108. The negative output junction is connected by a lead line 148 to one terminal of each of two energizing coils 150, 152 of two follower relays 154, 156.

The other terminal of the energizing coil 150 of the follower relay 154 is connected by a lead line 158 and a terminal 160 to the contact 116. The other terminal of the energizing coil 152 of the follower relay 156 is connected by a lead line 162 and a terminal 164 to the contact 114. Thus when the contact 112 touches the contact 116 the relay 154 will be energized and when the contact 112 touches the contact 114 the relay 156 will be energized.

Both of the follower relays 154, 156 are single pole double throw relays. In particular the relay 154 has a movable contact 166 which is normally closed against a first stationary contact 168 and is normally spaced from a second stationary contact 170. Similarly the relay 156 has a movable contact 172 which is normally closed against a first stationary contact 174 and is normally spaced from a second stationary contact 176. The movable contacts 166, 172 are connected by lead lines 178, 180 respectively, to the power terminals for the reversible D.C. motor 68.

A lead line 182 connects the negative output junction 142 of the rectifier bridge to both first stationary contacts 168, 174 and therefore also connects said stationary contacts to one another; thereby when the follower relays 154, 156 are idle the terminals of the D.C. motor will be short circuited. Said motor has a constantly energized field so that when its input terminals are short circuited its rotor windings are shunted whereby if the rotor is turning, the motor will be dynamically braked. To conserve energy and to lock the motor when the angle sensing device is not connected to a source of electric power I prefer to have a motor field which is permanently energized through the use of a permanent magnet.

A lead line 184 connects both of the second stationary contacts 170, 176 to the positive output junction 140 of the rectifier bridge.

The physical members associated with the electric circuit are denoted in FIG. 11 in order to show the complete servo follow-up loop (system) from the follower contacts to the motor to the drive shaft back to the follower contacts. Thus the dotted line 108 denotes the pendulum strut that carries the central contact 112, the dotted line 110 denotes the cage strut which carries the pair of contacts 114, 116, the dotted line 70 denotes the output shaft of the motor 68, the box I denotes the first 8:1 section of the reduction train including the pinions and gears 72, 74, 78, 80, the box II indicates the second 20:1 section of the reduction train including the pinions and gears 84, 86, 90, 92, the box III indicates the third 6:1 section of the reduction train including the pinion 96 and gear 98, the dotted line 82 denotes the second counter shaft, the dotted line 94 denotes the fourth counter shaft, the dotted line 42 denotes the drive shaft which actuates the cage strut 110 carrying the contacts 114, 116.

Figure 1:
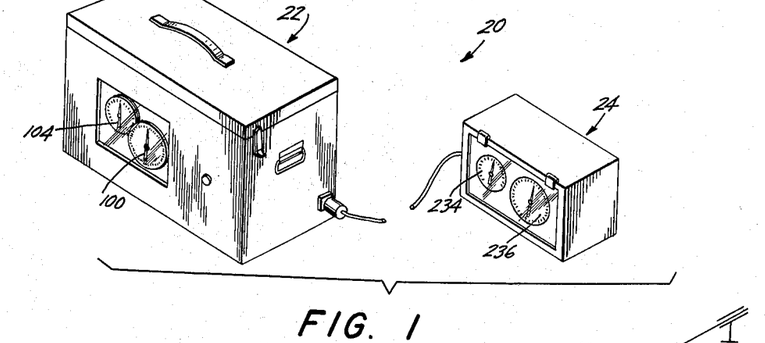
FIG. 1 is a perspective view of a master angle sensing unit incorporating my invention and of a slave unit adapted to be employed in conjunction therewith.
Figure 2:
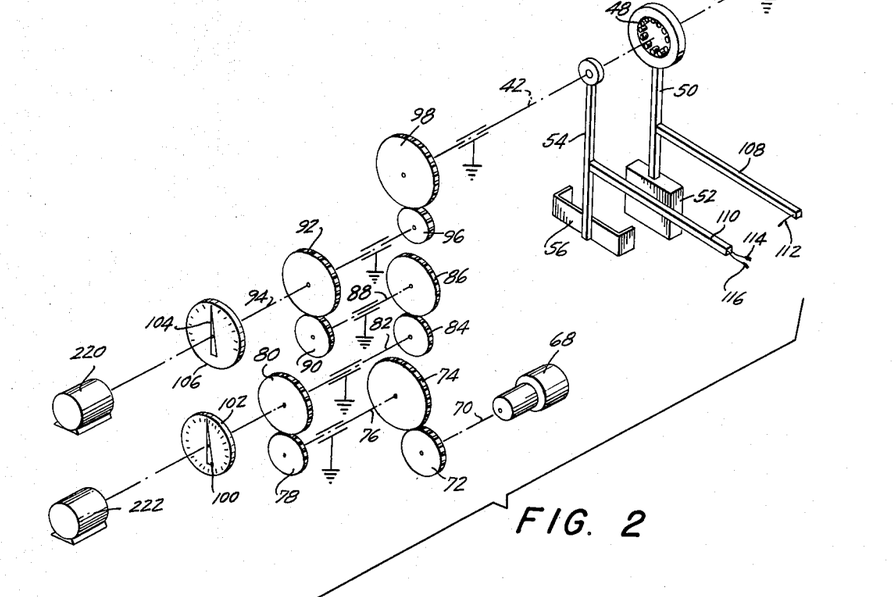
FIG. 2 is a schematic view of the component parts of said master sensing unit.

In the use of the angle sensing device 20 the master unit 22 is placed on a surface, usually a plane surface, the deviation of which from the horizontal is to be measured. Said plane surface is established by the four legs 32 of the frame, it being apparent that, if desired, only three legs need to be employed since they suffice to form a plane.

Quite apparently, the vertical seeking element is the pendulum weight 52 which is supported by the low friction loss system constituting the ball bearings 48. Preferably ultra precision ball bearings are employed to maintain the friction loss at a low level. The electric circuit is connected to an energy source, e.g., the source 130 of alternating current.

The pendulum, quite apparently, will seek a true vertical position. If at the time that the instrument is connected to power, the pendulum weight is spaced from both caging screws 64 and the central contact 112 is spaced from both of the contacts 114, 116 nothing will take place. However, as is more likely, the pendulum will move toward one or the other of the caging screws. Since the cage for the moment is stationary, the pendulum will strike such caging screw but immediately before that happens the central contact 112 will engage one or the other of the pair of contacts 114, 116. This will complete a circuit through the energizing coil of the proper one of the follow-up relays 154, 156 to drive the follow-up cage in the direction that the pendulum moved.

When the movable contact 166 or 172 on one or the other of the relays is closed, it will apply voltage to the D.C. motor 68 in such a sense to energize the motor to drive the cage in a direction away from the pendulum, i.e. to break the contact between the pendulum weight and the caging screw which it abuts.

When the motor is energized it will drive the cage in the foregoing direction through the train of reduction gears. The reduction is sufficiently great, e.g. at least 600 to 1 for a motor speed of 100 r.p.m. (these being the principal design parameters affecting frequency response of the servo follow-up system), for the frequency of response of the servo follow-up system to be less than (not in excess of a 0.5 ratio) the actual oscillatory frequency of the pendulum whereby when the cage moves subsequent to displacement of the device it permits the pendulum to seek the vertical. The pendulum weight will remain in engagement with one of the contacts until such time as the pendulum reaches a substantially vertical position (deviating from vertical by less than one-half the contact dead space).

It will be apparent that the actuation of the motor 68 with consequent movement of the cage is repeated at different angular rates at the fourth and second counter shafts which carry the coarse reading and fine reading indicator needles 104, 100. The second shaft in particular yields a highly amplified reading of the angular position of the cage. In this fashion it becomes extremely easy to read out the position of the cage and when the needles come to rest to read out the position of the pendulum weight.

Attention is called to the fact that when engagement is broken between the central contact 112 and the previously actuated one of the pair of contacts 114, 116 both follow up relays become idle so that the motor, and therefore the cage, is dynamically braked and quickly will come to a stop thus preventing over travel of the central contact and engagement between the central contact and the other of the pair of contacts 114, 116.

It also will be observed that the pendulum is not permitted to acquire any substantial angular momentum as it moves from any off-vertical to substantially vertical position inasmuch as its movement is continually checked (slowed) by the slow moving cage. Therefore the pendulum does not tend to swing far, if at all, beyond its true vertical position when released by the cage whereby when the pendulum reaches a substantially vertical position it will experience few, if indeed any, complete excursions sufficient to cause the central contact 112 to thereafter touch either one of the pair of contacts 114, 116 until the sensing device is shifted to a fresh angular position.

The accuracy of the sensing device is a function of the torque generated by the pendulum for a given angular displacement and the total friction or uncertainty torque as seen by the pendulum. Thus the angular displacement as represented by the pendulous torque to overcome friction becomes the basic accuracy limitation. In the angle sensing device 20 herein described the actual work performed by the pendulum is the closing of the electric servo circuit through the electric contact 112 and one or the other of the pair of contacts 114, 116 as well as overcoming the friction in the two ball bearings 48. This work is extremely slight so that the accuracy of the device is high.

It further will be appreciated that due to the servo follow-up system for the cage the motion of the pendulum is reproduced by the cage at a power level sufficient to drive angular data transmission units as well as to multply the pendulum motion several times so that, for example, one minute of arc of pendulum or cage motion is represented by a 2° motion of the pointer 100 which has a ratio of 120 to 1 to the drive shaft 42.

With a pendulum weight of sufficient mass and a pendulum arm of sufficient length, for example, a weight of a few pounds and an arm six inches long and with high quality ball bearings 48 the limiting accuracy factor in my angle sensing device is the contact dead space between the central contact 112 and the follow-up pair of contacts 114, 116. The natural, i.e. undamped, frequency of the pendulum is about 1.3 cycles per second. The spring contacts 114, 116 increase this frequency to provide an actual oscillatory frequency of about 2 cycles per second for the pendulum. In a desirable embodiment of my device the contact dead space has been kept to a maximum of two minutes of arc, i.e. a contact dead space of plus or minus one minute of arc. It will be understood, of course, that this value can be still further reduced through the use of longer struts 108, 110.

As noted above, the caging stops which limit free swinging movement of the pendulous mass serve the dual purpose of preventing overstressing of the contacts 112, 114, 116 and preventing the pendulous mass from building up a large angular momentum which would make it difficult to damp out the oscillatory pendulous motion. In the form of my invention described, the pendulum caging permits a motion of thirty minutes of the weight relative to the caging stop which is fifteen times greater than the relative motion between the central contact 112 and the follow-up contacts 114, 116 before engagement is made. This permits rapid settling of the complete system when a new value is to be read out.

The problem of settling the pendulum in a new vertical position is one of damping the servo loop as well as of rapidly bringing the remnant pendulum excursion to within the confines of the contact dead space. Theoretically, a pendulum with zero friction support never will come to rest unless some energy absorbing means is provided. As mentioned earlier, the use of a viscous damper is one such accepted common means. However, it entails the use of fluids and the settling of fluids which I wish to avoid. My pendulous weight is of course, not mounted with a zero friction support although the level of friction is quite small. The ball bearing 48 which constitute such support have two levels of friction namely the break-away torque required to start the bearings in motion from a standstill condition and the running torque. For most ball bearings, and this includes the ones that I have used herein, the ratio of break-away torque to running torque is about 3 to 1. Therefore in order to maintain the greatest sensitivity of the pendulum to angular changes of the frame 26 my device 20 makes no effort to bring the pendulum to a complete rest but actually uses the oscillatory pendulous motion of the weight 52 supported by the low loss friction bearings to keep the central contact 112 coursing in the dead space between the pair of follow-up contacts 114, 116 whereby the bearings 48 are kept in motion. The feature requires the use of coaxial axes of rotation for the pendulum and cage. Nevertheless, the caging technique that I have used prevents a large build-up of angular momentum, thus very greatly reducing the time required for the pendulous weight to reach a quasi-static substantially vertical state in which the central contact 112 oscillates between but does not touch the pair of contacts 114, 116.

I have observed heretofore that the relative motion between the central contact 112 and the lengths of the resilient pair of contacts 114, 116 is not perpendicular to but rather is oblique to the planes of the contact strips and, therefore, has two components, one being a contact (perpendicular) motion and the other a wiping (parallel) motion. Referring specifically to FIG. 7, the reference numeral 186 denotes the radial line from the center of the drive shaft 42 to the central contact 112. The reference numeral 188 denotes the line of motion of the central contact or of the pair of contacts, this being perpendicular to the radial line 186. The reference numeral 190 denotes the contact vector which is a component of the line of motion perpendicular to the lengths of the contact strips 114, 116 and the reference numeral 192 denotes the wiping vector which is the other orthogonal component of the line of motion.

The wiping action resulting from engagement or disengagement of the central contact 112 with either of the follow-up contacts 114, 116 produces a wiping friction which is energy absorbing as well as maintaining clean contact surfaces and helps to dampen relative motion between the pendulum and the cage when the cage reaches the vertical position of the pendulum. Furthermore, the spring action of the follow-up contacts 114, 116 increases the effective spring constant (actual oscillatory frequency) of the pendulum when the system is attempting to settle, i.e. to null.

The foregoing considerations also bear upon the reason for the low frequency response of the servo loop system which drives the cage to follow the pendulum. If the servo response had a frequency response equal to or greater than the actual oscillatory frequency of the pendulum, as soon as the contact 112 touched one or the other of the contacts 114, 116, the servo motor would drive the cage so rapidly as to break the contact and the pendulum damping effect due to contact wiping would be lost, resulting in overall oscillation of the system, i.e., of both the pendulum and cage, which would, for all practical purposes, result in an unstable and unusable condition. To avoid this, the frequency response of the servo follow-up is set at a value not exceeding one-half the actual oscillatory frequency of the pendulum. Actually in a preferred form of my invention the frequency response of the servo follow-up system is about one-fourth that of the actual oscillatory frequency of the pendulum when the pendulous weight is swinging between the follow-up contacts 114, 116.

Obviously, it also is necessary to prevent the cage from coasting when the motor 68 is deenergized and the coasting energy must be less than that which would cause the previously disengaged follow-up contact to engage the central contact so as to reverse the motor because this would result in a continuous oscillation of the system. All this is prevented as noted above by the use of a permanent magnetic field D.C. motor and a control circuit which provides for dynamic braking by directly shorting the motor armature when the follow-up relays both are idle.

When setting the device prior to use in the field the sensitivity adjustment screw 126 is turned with respect to the nut 128 to provide any desired contact dead space between the central contact 112 and the pair of servo follow-up contacts 114, 116. This adjustment will be set to provide a desired sensitivity, bearing in mind that if the contact dead space is too greatly reduced the instrument tends to become unstable.

As to the zero adjusting screw 122, it is employed after the device has been approximately calibrated, i.e., after the servo driven indicators 100, 104 have been set to read the approximate value of the reference test plane. Thereafter the final precise adjustment is made by use of said screw 122. The screw bears upon the stack of insulating spacers 118 which is urged against the screw by the leaf spring 120. Turning the screw moves the contacts 116, 114 jointly without moving the pendulous weight and drives the cage to a new position whereby to provide a precise control of setting for the final zeroing and for easy recalibration of the instrument.

Figure 9:
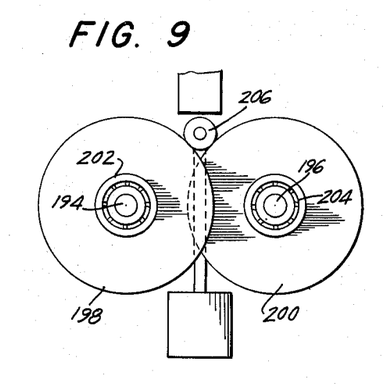
FIG. 9 is a side view of a modified form of suspension system for the pendulum of the master unit of an angle sensing device embodying my invention.
Figure 10:
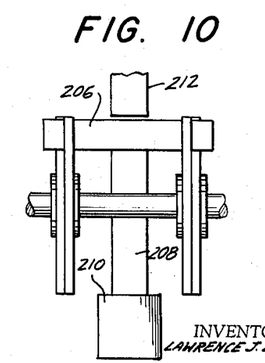
FIG. 10 is a front view of said modified suspension system.

It may be mentioned that my invention is not limited to the particular low loss friction mounting constituting the bearings 48 for rotatably journalling the pendulum. An alternate form of mounting is shown in FIGS. 9 and 10. Such mounting constitutes a pair of parallel horizontal shafts 194, 196 on which drums 198, 200 are supported by means of ball bearings 202, 204. The drums overlap one another as shown in FIG. 9 and moreover two horizontally spaced pairs of such drums are provided as shown in FIG. 10. A horizontal shaft 206 rests on all four of said drums and therefore has the benefit of the low friction support of all four pairs of ball bearings 202, 204. Said shaft 206 serves as the support for a pendulum of an angle sensing device embodying my invention. The cage shaft (not shown) is mounted for rotation about the same axis as the shaft 206. The shaft 206 supports a pendulum arm 208 at the lower end of which is attached a pendulum weight 210. A retainer 212 is located above the shaft 206 to prevent inadvertent displacement thereof should the device accidentally be inverted.

The master unit 22 as described above will provide a visual angular read out at the spot on which the legs 32 are supported, the coarse needle 104 giving a six to one magnified reading of the rest position of the pendulum and the fine needle 100 giving one hundred twenty to one magnification of such rest position. However, it frequently is desirable in the use of my device to repeat either, or preferably both, the coarse and fine readings at a remote spot and it is for this reason that I have provided the slave unit 24. Essentially the slave unit constitutes a pair of standard repeaters which repeat the positions of the needles 100, 104.

Figure 13:
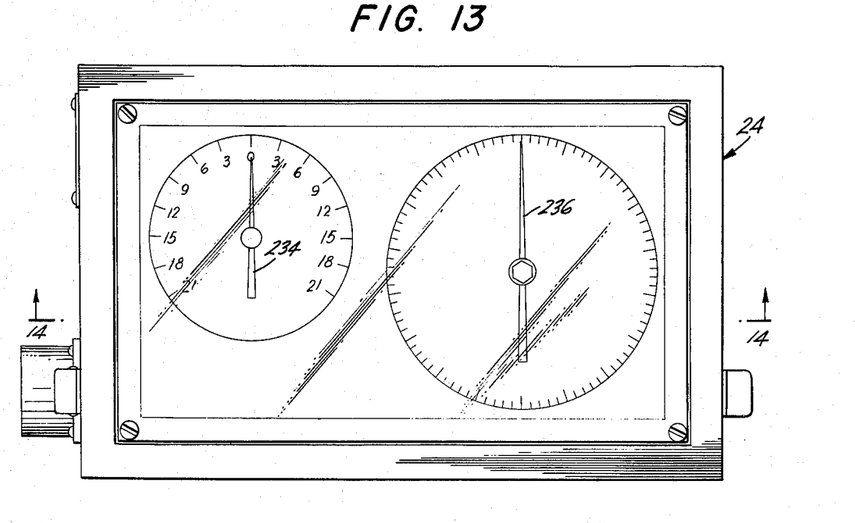
FIG. 13 is an enlarged front view of the slave unit.
Figure 14:
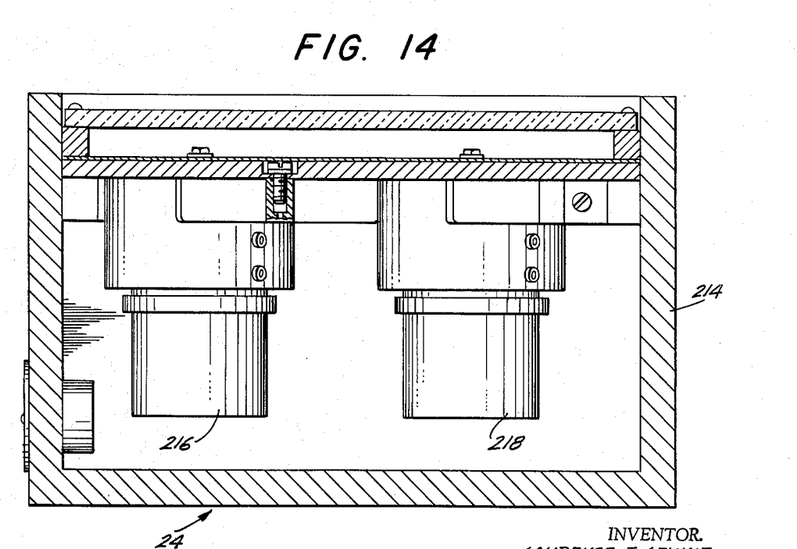
FIG. 14 is a sectional view taken substantially along the line 14—14 of FIG. 13.

More particularly, the slave unit 24 includes a housing 214 containing a first synchro motor 216 and a second synchro motor 218. The first synchro motor 216 is the coarse motor and the second synchro motor 218 is the fine motor. The synchro motor 216 is driven by a first synchro generator 220 and the second synchro motor 218 is driven by a second synchro generator 222. The first synchro generator 220 is turned by the fourth counter shaft 94 and the second synchro generator 222 is turned by the second counter shaft 82.

Figure 12:
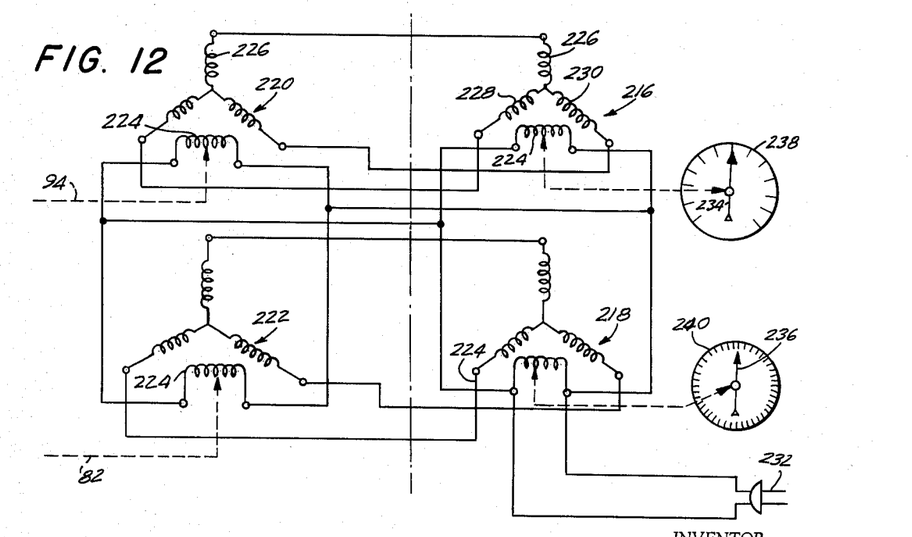
FIG. 12 shows the electric circuit for connecting the slave unit to the master unit.

The electric connections between the synchro motors and generators is conventional the same being shown by way of illustration in FIG. 12. Each motor and generator 216, 218, 220, 222 includes an armature winding 224 and a star connected set of three field windings 226, 228, 230. The armature windings 224 are energized in parallel from a source 232 of 60 cycle single phase alternating current. The field windings of the coarse generator and motor 220, 216 and of the fine generator and motor 222 and 218 are connected in tandem whereby rotation of the armature of either will cause a correspondent rotation of the armature of its associated motor.

The armatures of the coarse and fine motors drive coarse and fine slave pointers 234, 236 readable against dials 238, 240 respectively. The armatures of the coarse and fine generators 220, 222 are driven by the fourth counter shaft 94 and the second counter shaft 82 respectively.

Read out of angles from the indicators may be expedited by coloring differently the graduations associated with clockwise displacement from zero (vertical) as distinguished from graduations associated with counter-clockwise displacements. For example, in both the master and slave units the graduations clockwise of the zero point on the coarse dials 106 and 238 are of a first color and the graduations counterclockwise of the zero point on these dials are of a second color. Likewise a full 360° set of graduations on the fine dials 100 and 236 read clockwise in the first color and another full 360° set of graduations on these fine dials read counterclockwise in the second color.

It thus will be seen that I have provided devices which achieve the several objects of my invention and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. A device for sensing angles of inclination, said device comprising a frame adapted to be supported on an object, a pendulum, means mounting said pendulum on said frame for rotation about a horizontal axis, a cage, reversible motor means to turn said cage about an axis coincident with the axis of rotation of the pendulum, said cage including stops limiting motion of the pendulum with respect thereto in opposite directions to an angle of movement which is small in relation to 360°, and a servo system actuated by movement of the pendulum relative to the cage to energize the motor in a direction such as to drive the cage in the same direction as the pendulum, until the pendulum is substantially vertical, the frequency response of the servo system being not in excess of one-half the actual oscillatory frequency of the pendulum.

2. A device for sensing angles of inclination, said device comprising a frame adapted to be supported on an object, a pendulum, means mounting said pendulum on said frame for rotation about a horizontal axis, a cage, reversible motor means to turn said cage about an axis parallel to the axis of rotation of the pendulum, said cage including stops limiting motion of the pendulum with respect thereto in opposite directions to an angle of movement which is small in relation to 360°, sensing means movable with the cage and separate from the stops and responsive to movement of the pendulum relative to the cage, and a servo system actuated by operation of said sensing means to energize the motor in a direction such as to drive the cage in the same direction as the pendulum until the pendulum is substantially vertical, the frequency response of the servo system being not in excess of one-half the actual oscillatory frequency of the pendulum.

3. A device for sensing angles of inclination, said device comprising a frame adapted to be supported on an object, a pendulum, means mounting said pendulum on said frame for rotation about a horizontal axis, a cage, reversible motor means to turn said cage about an axis parallel to the axis of rotation of the pendulum, said cage including stops limiting motion of the pendulum with respect thereto in opposite directions to an angle of movement which is small in relation to 360°, a servo system actuated by movement of the pendulum relative to the cage to energize the motor in a direction such as to drive the cage in the same direction as the pendulum until the pendulum is substantially vertical, the frequency response of the servo system being not in excess of one-half the actual oscillatory frequency of the pendulum, and energy absorbing means effective to dampen movement of the pendulum relative to the cage between the stops.

4. A device for sensing angles of inclination, said device comprising a frame adapted to be supported on an object, a pendulum, means mounting said pendulum on said frame for rotation about a horizontal axis, a cage, reversible motor means to turn said cage about an axis parallel to the axis of rotation of the pendulum, said cage including stops limiting motion of the pendulum with respect thereto in opposite directions to an angle of movement which is small in relation to 360°, sensing means movable with the cage and separate from the stops and responsive to movement of the pendulum relative to the cage, and a servo system actuated by operation of said sensing means to energize the motor in a direction such as to drive the cage in the same direction as the pendulum until the pendulum is substantially vertical, the frequency response of the servo system being not in excess of one-half the actual oscillatory frequency of the pendulum, and energy absorbing means effective to dampen movement of the pendulum relative to the cage only beyond the sensing means and between the stops.

5. A device for sensing angles of inclination, said device comprising a frame adapted to be supported on an object, a pendulum, means mounting said pendulum on said frame for rotation about a horizontal axis, a cage, reversible motor means to turn said cage about an axis parallel to the axis of rotation of the pendulum, said cage including stops limiting motion of the pendulum with respect thereto in opposite directions to an angle of movement which is small in relation to 360°, sensing means separate from the stops and responsive to movement of the pendulum relative to the cage, and a servo system actuated by operation of said sensing means to energize the motor in a direction such as to drive the cage in the same direction as the pendulum until the pendulum is substantially vertical, the frequency response of the servo system being not in excess of one-half the actual oscillatory frequency of the pendulum, and energy absorbing wiping friction means effective to dampen movement of the pendulum relative to the cage only beyond the sensing means and between the stops.

6. A device for sensing angles of inclination, said device comprising a frame adapted to be supported on an object, a pendulum, means mounting said pendulum on said frame for rotation about a horizontal axis, a cage, reversible motor means to turn said cage about an axis parallel to the axis of rotation of the pendulum, said cage including stops limiting motion of the pendulum with respect thereto in opposite directions to an angle of movement which is small in relation to 360°, a pair of sensing means carried by the cage on opposite sides of the pendulum to be engaged thereby upon movement of the pendulum relative to the cage and before the pendulum has movement thereof limited by the stops, energy aborbing means effective to dampen movement of the pendulum relative to the cage only beyond the sensing means and between the stops, and a servo system controlled by the sensing means upon actuation thereof to energize the motor in a direction such as to drive the cage in the same direction as the pendulum until the pendulum is substantially vertical, the frequency response of the servo system being not in excess of one-half the actual oscillatory frequency of the pendulum.

7. A sensing device as set forth in claim 6 wherein the energy absorbing means is a wiping friction means.

8. A sensing device as set forth in claim 7 wherein the wiping friction means constitutes a pair of leaf springs on opposite sides of the pendulum and which are engaged by the pendulum before the pendulum contacts the stops.

9. A sensing device as set forth in claim 8, wherein the leaf springs are arranged with their planes oblique to the movement of the pendulum at an angle such that the engagement between the pendulum and the leaf springs has an appreciable wiping vector and an appreciable contact vector.

10. A device for sensing angles of inclination, said device comprising a frame adapted to be supported on an object, a pendulum element, means mounting said pendulum element on said frame for rotation about a horizontal axis, a cage element, reversible motor means to turn said cage element about an axis parallel to the axis of rotation of the pendulum element, a high ratio gear reduction train interconnecting the reversible motor means and the cage element, a pair of spaced electric contacts carried by one of said elements, an intermediate electric contact carried by the other element and located between said pair of contacts, the space between said pair of contacts including a substantial component parallel to the motion of pendulum element movement, a dead space being provided between said intermediate contact and said pair of contacts whereby the intermediate contact will engage one or the other of the spaced contacts when the pendulum element experiences motion with respect to the cage element, said cage element including stops limiting motion of the pendulum element to an angle which is small with respect to 360° and providing a dead space in excess of the contact dead space, said contacts providing energy absorbing wiping friction means effective to dampen movement of the pendulum element relative to the cage element between the stops and only when the intermediate electric contact engages one or the other of the spaced electric contacts, and a servo system actuated by engagement of the intermediate contact with one or the other of the spaced contacts to energize the motor in a direction such as to drive the cage element in the same direction as the pendulum element until the pendulum element is substantially vertical, the frequency response of the servo system being not in excess of one-half the actual oscillatory frequency of the pendulum element.

11. A sensing device as set forth in claim 10 wherein the pair of spaced contacts are leaf springs and wherein the planes of the leaf springs are oblique to the direction of movement of the intermediate contact and are at an angle such that engagement between the intermediate contact and the spaced contacts has an appreciable wiping vector and an appreciable contact vector.

12. A sensing device as set forth in claim 10 wherein the cage element and the pendulum element include struts respectively fixed thereto and extending away therefrom at a substantial angle thereto, said contacts being carried by said struts.

13. A sensing device as set forth in claim 10 wherein an electric circuit controlled by the contacts connects the motor for dynamic braking when the intermediate contact is clear of the spaced contacts.

14. A sensing device as set forth in claim 11 wherein the pair of spaced contacts comprises a pair of leaf springs which are generally parallel to one another, a member on which said leaf springs are jointly cantilever supported in spaced apart relationship, screw means for selectively urging the leaf springs toward one another to vary the dead space between the intermediate contact and the pair of spaced contacts, a further leaf spring cantilever mounting said member on the associated element for selective movement relative thereto in a direction having a substantial component parallel to the motion of the pendulum element, and further screw means to shift the position of said member relative to the associated element whereby upon such movement of the member the positions of both spaced contacts are conjointly varied with respect to the intermediate contact so as to vary the zero setting of the sensing device.

(References on following page)

References Cited by the Examiner

UNITED STATES PATENTS

| | | | |
|---|---|---|---|
| 1,166,951 | 1/1916 | Von Krame et al. | |
| 1,380,335 | 5/1921 | Paxton | 33—226 |
| 1,500,239 | 7/1924 | Davis | 33—266.6 |
| 1,917,017 | 7/1933 | Chantemerle | 33—226.6 |
| 2,128,559 | 8/1938 | Harding et al. | 33—226.6 |
| 2,138,912 | 12/1938 | Foss. | |
| 2,338,147 | 1/1944 | Von Den Steinen. | |
| 2,362,135 | 11/1944 | James | 33—206.5 X |
| 2,418,762 | 4/1947 | Dehn et al. | 200—166 |
| 2,492,244 | 12/1949 | Shivers. | |
| 2,552,890 | 5/1951 | Eisler | 33—220.5 X |
| 2,755,356 | 7/1956 | Jucker | 200—166.1 X |
| 2,837,616 | 6/1958 | Jaidinger | 200—166 |

FOREIGN PATENTS 305,129  12/1920  Germany.

LOUIS R. PRINCE, *Primary Examiner.*
ROBERT B. HULL, *Examiner.*